Jan. 6, 1925.  
W. M. WEBSTER ET AL  
1,521,738  
MULTIPLE DRILLING MACHINE  
Filed March 15, 1922

INVENTORS,  
WILLARD M. WEBSTER  
AND GEORGE D. WERNLI,  
BY  
Robert D. Pearson,  
ATTORNEY.

Patented Jan. 6, 1925.

1,521,738

UNITED STATES PATENT OFFICE.

WILLARD M. WEBSTER AND GEORGE D. WERNLI, OF LOS ANGELES, CALIFORNIA.

MULTIPLE DRILLING MACHINE.

Application filed March 15, 1922. Serial No. 543,965.

*To all whom it may concern:*

Be it known that we, WILLARD M. WEBSTER and GEORGE D. WERNLI, citizens of the United States, both residing at Los Angeles, in the county of Los Angeles and State of California, have invented certain new and useful Improvements in a Multiple Drilling Machine, of which the following is a specification.

The present invention relates to improvements in multiple drilling machines, and its object is to provide a support or frame which is constructed and arranged to permit any multiple of driven drill-units from a single main line shaft, with arms connected thereto to hold the said units at equal spaces from one another.

Another object is to provide a lattice frame that will control the spaces between the drill units, at equal distances from one another, in a straight line.

The object stated is attained by means of a novel combination and arrangement of parts to be hereinafter described and claimed, and in order that the same may be better understood, reference is had to the accompanying drawing forming a part of this specification.

In the drawing Figure 1 is a plan view of the multiple drilling machine.

Figure 1:
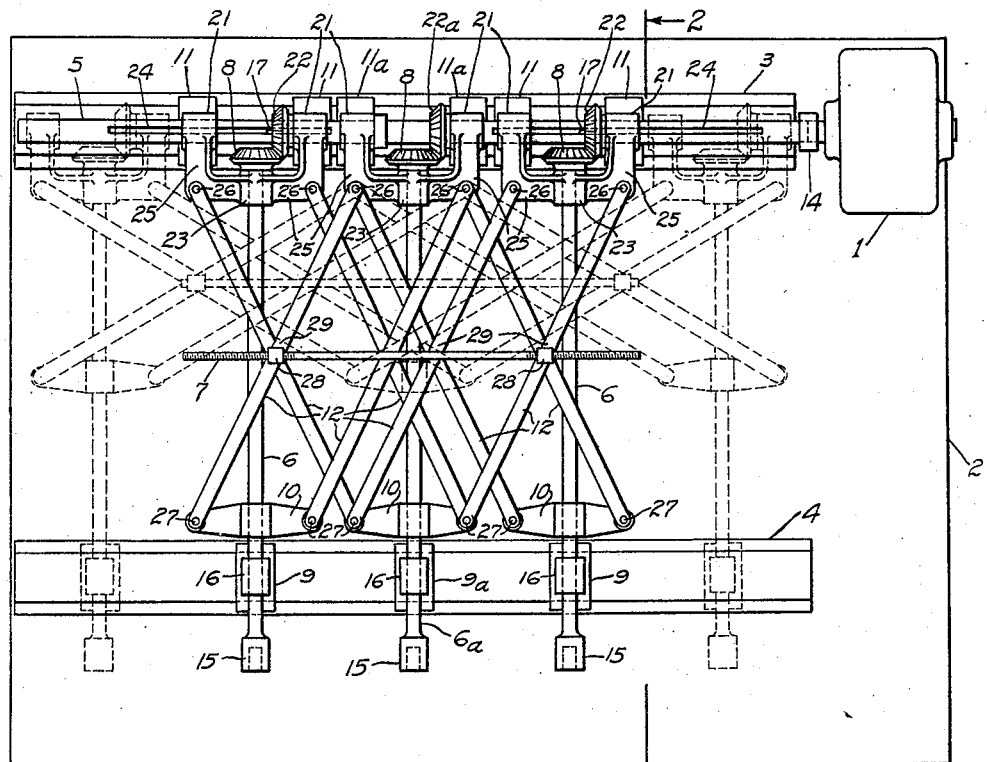
Figure 2:
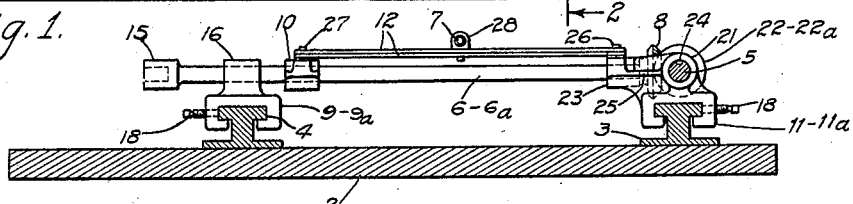
Figure 2 is a sectional view on line 2—2 of Figure 1.

Referring specifically to the drawing in which like characters of reference designate similar parts, 2 represents the plate, the rails 3 and 4 are secured on the said plate 2, parallel to one another, the yoke 11ª is secured on the central portion of the rail 3, and the yokes 11 are operatively positioned on the said rail 3, on the two sides of the yoke 11ª, the guides 9 and 9ª are positioned on the rail 4 on center lines opposite the said yokes 11 and 11ª respectively, the shafts 6 and 6ª are operatively positioned between the bearings 23 and 16, the chucks 15 are integral with one end of the said shafts 6 and 6ª, adjacent to the outer sides of the said bearings 16, and the gears 8 are secured to the inner ends of the said shafts 6 and 6ª, adjacent to the inner sides of the bearings 23, the said bearings 16 and 23 are integral with the top-center portions of the guides 9, 9ª and the yokes 11, 11ª respectively, the bearings 21 are integral with the two end portions of the yokes 11 and 11ª with the centers thereof positioned parallel with the said rail 3, the shaft 5 is operatively positioned in the said bearings 21, the keyways 24 are positioned in both ends of the shaft 5 within the travel of the slidable yokes 11, the gears 22 are slidably positioned on the shaft 5 between the bearings 21 on the yokes 11, and the gear 22ª is secured to the said shaft 5 between the bearing 21 on the yoke 11ª, the said gears 22 and 22ª in turn mesh operatively with the gears 23, the keys 17 are slidably positioned in the said keyways 24 and operatively hold the said gears 22 on the shaft 5. The yokes 11 and 11ª are formed with flanges 25 on both sides of the bearings 23, and between the bearings 21, with the joints 26 positioned on the outer ends thereof, the bars 12 are operatively latticed in the form of lazy tongs from the said joints 26 to the joints 27, the said joints 27 are integral with the slides 10, and the said slides 10 are in turn slidably positioned on the shaft 6. The distance between the two joints 26 on the yokes 11 and 11ª, and the two joints 27 on the slides 10 are the same, and the length of the bars 12 from the joints 26 to the joints 27 are likewise the same, the said bars 12 are operatively latticed in pairs between the joints 26 and 27 and reach from one pair of joints 27 holding the relative shaft 6, to a pair of joints 26 in the flanges 25 and bearing 23 holding the adjoining shaft 6, as shown in Figure 1, and pass one another at the joints 28 and crosses 29, the said joints 28 are operatively secured to the crosses 29 on two pairs of bars 12, and the screw 7 is operatively positioned in the said joints 29 with righthand and lefthand threads on the respective two ends thereof. The screws 18 are operatively positioned in the yokes 11—11ª and the guides 9—9ª, and bear against the rails 3 and 4 respectively. The motor 1 is secured to the plate 2 and is connected to one end of the shaft 5 by the coupling 14.

Figure 3:
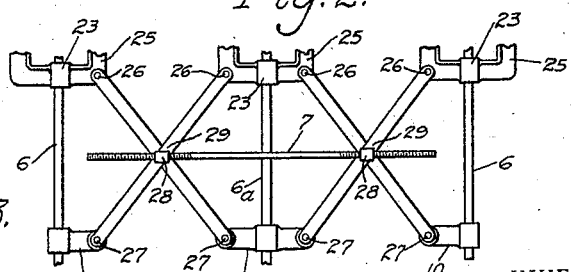
Figure 3 is a part plan view of a modified form of a multiple drilling machine.

To use the drilling machine where a straight line of equally spaced holes are to be drilled, counterbored, reamed, or special operations are to be made, the screw 7 may be turned in the joints 28, to extend or contract the latticed bars 12, thus the slides 10 are shifted on the shafts 6 and 6ª in a line with the yokes 11 and 11ª, at right angles to the shaft 5. With the yoke 11ª and guide 9ª secured to the rails 3 and 4, as hereinbefore described, the yokes 11 and guides 9 will slide over the said rails 3 and 4 respectively on the two sides of the said yoke 11ª and guide 9ª, as the latticed bars 12 extend or contract the center distance between the shafts 6 and 6ª. The crosses 29 formed between the pairs of bars 12, as shown in Figures 1 and 3, expand and contract between the joints 26 and 27, and between the yokes 11 and 11ª, and between the slides 10, thus when the center distance between the several shafts 6—6ª are changed, the slides 10 will shift up or down thereon, as hereinbefore described.

To operate the multiple drilling machine the motor is started to drive the shaft 5 in the bearings 21, by the gears 22 and 22ª positioned thereon, the said gears 22 and 22ª then transmit the power from the shaft 5 to the gears 8, and thence to the shafts 6 and 6ª thru the bearings 23 and 16, to the required tools in the chucks 15, to perform the desired operations.

The yokes 11—11ª and the guides 9—9ª are clamped into position on the rails 3 and 4 respectively by turning the screws 18 thru the said yokes 11—11ª, and the guides 9—9ª, after the bars 12 are expanded or contracted to adjust the center distance between the shafts 6 and 6ª.

Having thus described this invention, what we claim is:

In a multiple drilling machine of the class described, a frame, an upper rail and a lower rail secured on said frame, a plurality of upper bearing heads adjustably mounted on said upper rail, a plurality of lower bearing heads adjustably mounted on said lower rail in alignment respectively with said upper bearing heads, a drive shaft slidably journaled in said upper bearing heads, a plurality of spindles, each of which is journaled at its upper end in one of said bearing heads and at its lower end in the lower bearing head aligned with said upper bearing head, gearing between said drive shaft and each spindle whereby said spindles are driven by said shaft, slides mounted respectively on said spindles, lazy tongs connected to said upper bearing heads and to said slides, and a rod in threaded engagement with the joints at the crosses of the outermost bars of said lazy tongs for adjusting the spindles closer together or further apart.

In testimony whereof we affix our signatures.

WILLARD M. WEBSTER.
GEO. D. WERNLI.